UNITED STATES PATENT OFFICE.

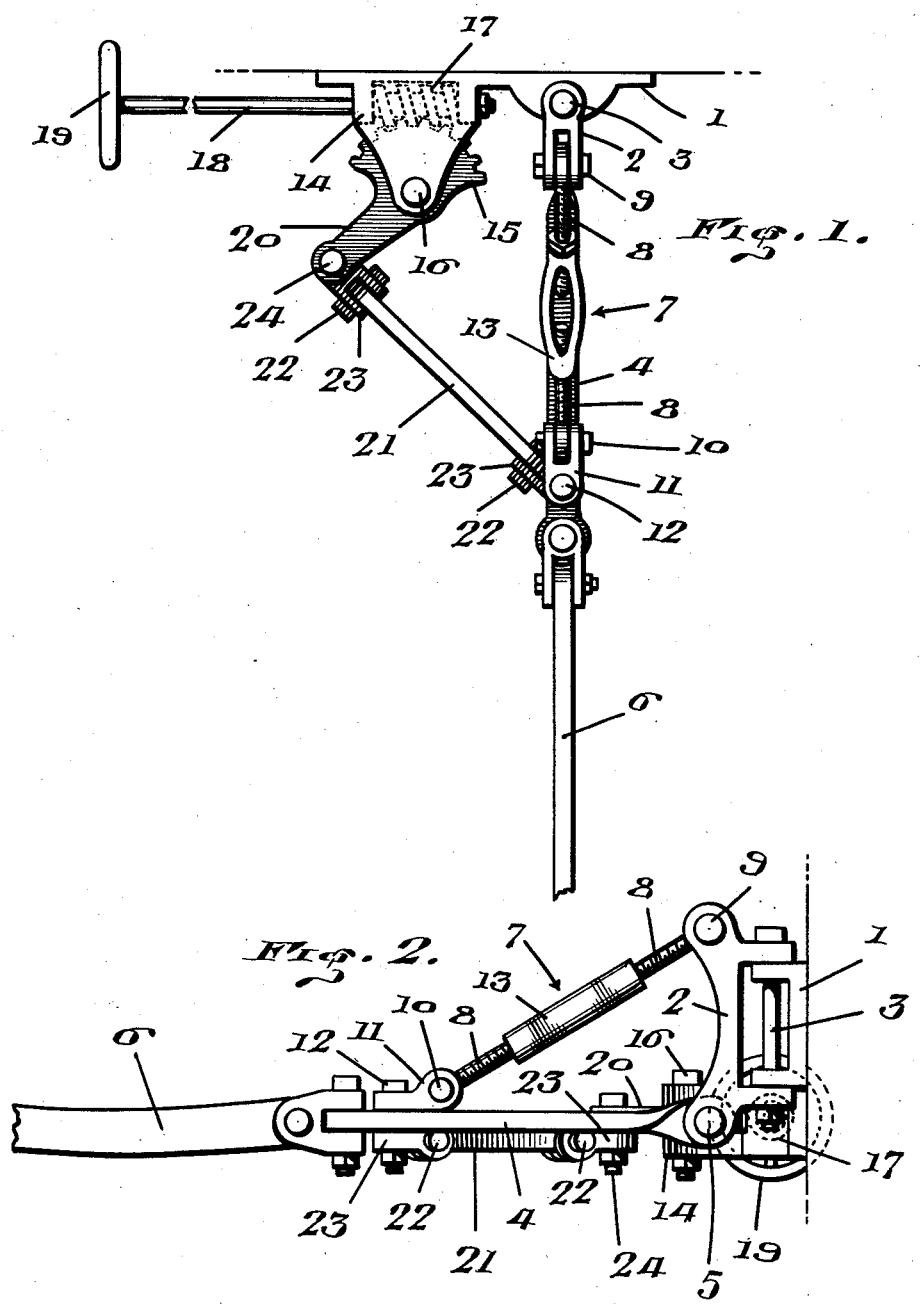

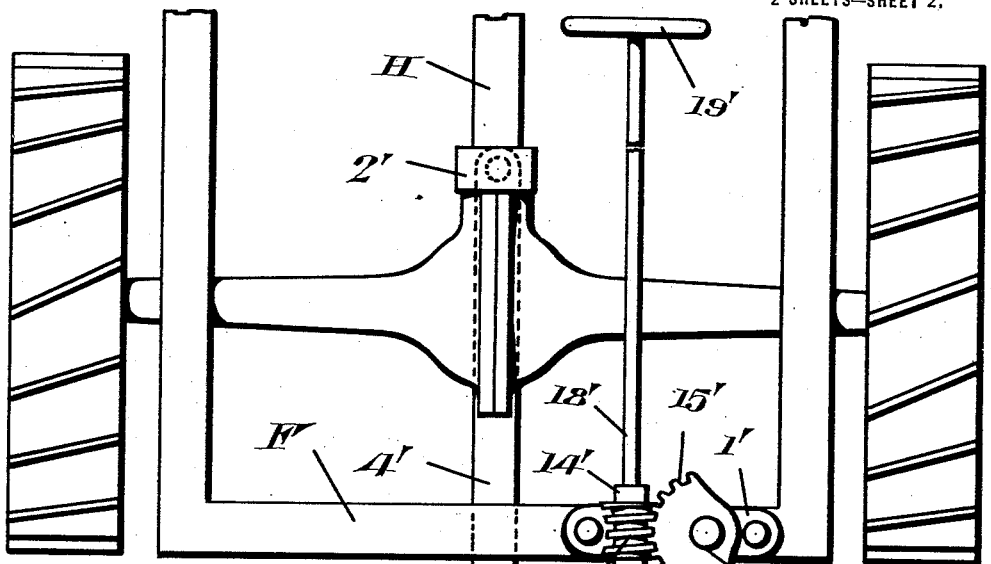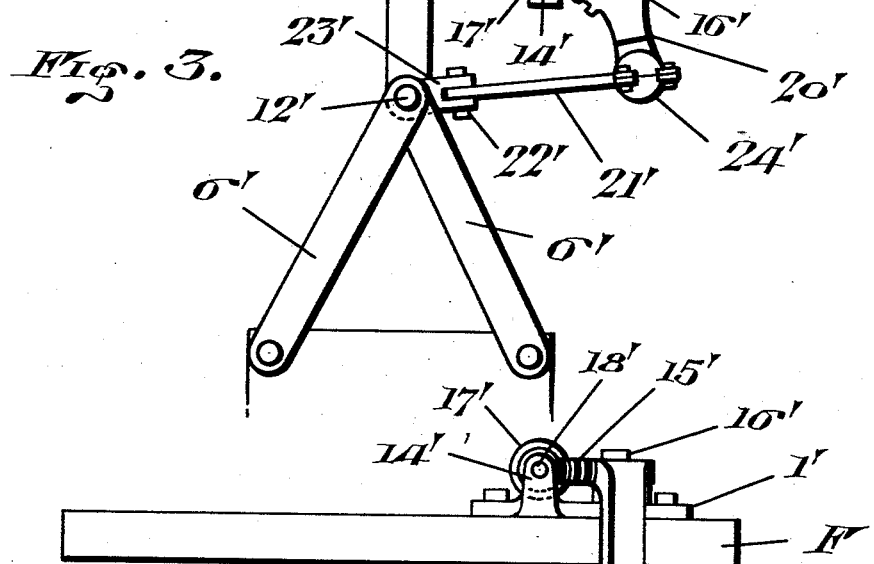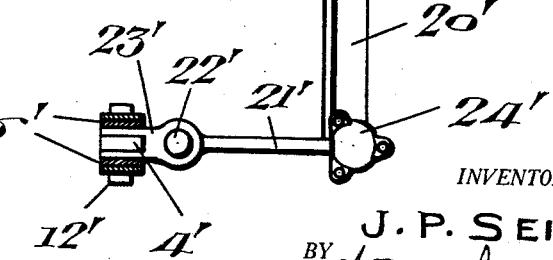

JAMES P. SEITZ, OF WALLA WALLA, WASHINGTON.

TRACTOR-DRAW-BAR ATTACHMENT.

1,340,504.     Specification of Letters Patent.     Patented May 18, 1920.

Application filed October 14, 1919. Serial No. 330,539.

*To all whom it may concern:*

Be it known that I, JAMES P. SEITZ, a citizen of the United States, residing at Walla Walla, in the county of Walla Walla and State of Washington, have invented certain new and useful Improvements in Tractor-Draw-Bar Attachments; and I do hereby declare the following to be a full, clear, and exact description of the invention, such as will enable others skilled in the art to which it appertains to make and use the same.

The present invention relates to draft devices, and aims to provide a novel and improved draft attachment for a tractor to hitch or connect a plow or other implement thereto, and enabling the relative position of the implement to be adjusted with respect to the tractor or point of connection.

It is the object of the invention to provide a draw bar for pulling a plow or other implement, with means for pivotally connecting said draw bar to the tractor and novel means for adjusting the draw bar sidewise to shift the device laterally to the desired position with respect to the tractor.

A further object is the provision of a novel and improved device for swinging the draw bar sidewise and holding it in any position to which it is set.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the attachment.

Fig. 2 is a side elevation thereof.

Fig. 3 is a plan view of a modification.

Fig. 4 is a rear view of the modification.

The device shown in Figs. 1 and 2 embodies a plate or casting 1 adapted to be bolted or otherwise secured to the rear end of the tractor frame, and a member 2 is pivotally connected to the plate 1 by a vertical pivot 3 enabling said member to swing on a vertical axis toward either side from its rearwardly extending position. A rearwardly extending draw bar 4 has its forward end pivoted, as at 5, to the lower end of the member 2, to swing upwardly and downwardly about a horizontal axis, and said draw bar is swingable with the member 2 about the vertical axis, enabling said draw bar to be adjusted both sidewise and vertically, to adjust the position of the plow beam 6 which is connected to the rear end of the draw bar by any suitable coupling.

The vertical position of the draw bar 4 is regulated by means of an adjustable brace 7 between said draw bar and upper end of the member 2, said brace embodying bolts or stems 8, one pivoted, as at 9, to the upper end of the member 2, and the other pivoted, as at 10, to a piece 11 pivoted on the draw bar 4 by a vertical pivot 12. The stems 8 are connected by a turn buckle 13, which in being rotated will lengthen or shorten the brace to move the draw bar 4 downwardly or upwardly, respectively, and hold it in its vertically adjusted position. This brace 7 adjustably connects the draw bar with the member 2 and swings as a unit with said draw bar and member.

The means for adjusting the draw bar sidewise includes a bracket 14 extending rearwardly from the plate 1 at one side of the draw bar, and a worm segment 15 pivoted, as at 16, within the bracket and meshing with a worm 17 disposed within the bracket in rear of the segment parallel with the plate 1. This worm 17 is mounted on a transverse shaft 18 that is journaled in the bracket 14, and said shaft extends to one side and has a hand wheel 19 for conveniently rotating the worm from one side of the tractor, to thereby turn the segment 15.

The segment 15 has an arm 20 extending rearwardly therefrom at an angle away from the draw bar, and said arm is connected to the draw bar by means of a link 21. The ends of the link 21 are pivoted, as at 22, to pieces 23, one of which is connected to the draw bar 4 by the pivot 12, and the other piece 23 is connected by a pivot 24 to the arm 20. The pivots 22 permit the link 21 to swing upwardly and downwardly with the draw bar 4, when said draw bar is adjusted by the turn buckle 13. The lateral position of the draw bar is determined by the position of the arm 20, and said arm can be swung readily by turning the hand wheel 19. This will swing the draw bar to the desired position, and hold it firmly in such position thereby obtaining a convenient and accurate adjustment.

A modified form is shown in Figs. 3 and 4, wherein the draw bar 4' is pivoted at its forward end to a clamp or member 2' connected to the tractor, such as to the propeller shaft housing H. A plate 1' is secured on the tractor frame F and has the brackets or bearing 14' in which the operating shaft 18' is journaled. Said shaft has a hand wheel 19' for turning it, and a worm 17' is secured on said shaft between the bearings and meshes with a worm segment 15' pivoted, as at 16', on the plate 1'. The segment 15' has an arm 20' which extends rearwardly and downwardly, and a link 21' connects the arm 20' and draw bar 4'. One end of the link 21' is pivoted, as at 22', to a piece 23' which engages a pivot 12' of the draw bar 4' to which the connecting links 6' are connected. Said links being attached to the plow or other device which is to be pulled. The other end of the link 21' is connected by a ball and socket connection with the arm 20' so that said link 21' can swing horizontally and vertically similar to the link 21 above described.

Having thus described the invention, what is claimed as new is:—

1. A draft attachment embodying a plate, a pivoted bar, an arm pivotally connected to said plate, a link connecting said arm and draw bar, and means carried by the plate for swinging said arm and holding it in various positions to which it is swung.

2. A draft attachment embodying a plate, a pivoted draw bar, a worm segment carried by said plate and having an arm, a link connecting said arm and draw bar, and an adjusting worm carried by the plate meshing with said segment.

3. A draft attachment embodying a plate, a pivoted draw bar, an arm pivoted to the said plate, a link having pivotal connections with said arm and draw bar to permit the link to swing with the draw bar horizontally and vertically, and means carried by the plate for swinging said arm and holding it in various positions to which it is swung.

4. A draft attachment embodying a plate, a pivoted draw bar, a worm segment pivoted to said plate, a link having pivotal connections with said arm and draw bar to swing in various directions with said draw bar, a shaft mounted on said plate, and a worm carried by the shaft meshing with said segment.

In testimony whereof I have signed my name to this specification in the presence of two subscribing witnesses.

JAMES P. SEITZ.

Witnesses:
J. G. THOMAS,
W. A. TONER.